United States Patent
Goerick

(10) Patent No.: US 9,446,729 B2
(45) Date of Patent: Sep. 20, 2016

(54) DRIVER ASSISTANCE SYSTEM

(71) Applicant: HONDA RESEARCH INSTITUTE EUROPE GMBH, Offenbach/Main (DE)

(72) Inventor: Christian Goerick, Seligenstadt (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/098,642

(22) Filed: Dec. 6, 2013

(65) Prior Publication Data

US 2014/0172226 A1 Jun. 19, 2014

(30) Foreign Application Priority Data

Dec. 18, 2012 (EP) .................................. 12197638

(51) Int. Cl.
| | |
|---|---|
| G01C 22/00 | (2006.01) |
| G05D 1/00 | (2006.01) |
| B60R 21/00 | (2006.01) |
| B60W 50/00 | (2006.01) |
| B60W 50/16 | (2012.01) |
| B60T 7/22 | (2006.01) |

(Continued)

(52) U.S. Cl.
CPC ................ B60R 21/00 (2013.01); B60T 7/22 (2013.01); B60W 30/09 (2013.01); B60W 30/095 (2013.01); B60W 50/0097 (2013.01); B60W 50/16 (2013.01); *B60T 2201/022* (2013.01); *B60T 2201/024* (2013.01); *Y02T 10/84* (2013.01)

(58) Field of Classification Search
CPC ........... B60W 50/0097; B60W 50/16; B60W 30/09; B60W 30/095; B60T 7/22; B60R 21/00
USPC .......................................................... 701/28
See application file for complete search history.

(56) References Cited

U.S. PATENT DOCUMENTS

| | | | |
|---|---|---|---|
| 6,622,076 B1 | 9/2003 | Eckert et al. | |
| 6,934,614 B2 | 8/2005 | Yamamura et al. | |
| 7,069,146 B2 | 6/2006 | Yamamura et al. | |

(Continued)

FOREIGN PATENT DOCUMENTS

| | | |
|---|---|---|
| DE | 10036276 A1 | 2/2002 |
| DE | 102006042666 A1 | 3/2008 |

(Continued)

OTHER PUBLICATIONS

European Search Report dated May 8, 2013 corresponding to European Patent Application No. 12197638.5.

*Primary Examiner* — Maceeh Anwari
(74) *Attorney, Agent, or Firm* — Squire Patton Boggs (US) LLP

(57) ABSTRACT

The invention provides a driver assistance method, comprising the steps of: sensing a vehicle's state and the environment, on the basis of sensing output signals, determining whether a critical state of the vehicle is to be expected in the future, if yes, determining a total amount and a time duration of an activation of at least one vehicle actuator required in order to avoid occurrence of the critical state, the activation being of a nature which can be sensed by the driver of the vehicle, and partially performing, by a control module, the activation, i.e. for a portion of the amount and/or a portion of the time duration of the determined total amount and time duration.

11 Claims, 3 Drawing Sheets

Figure 1:
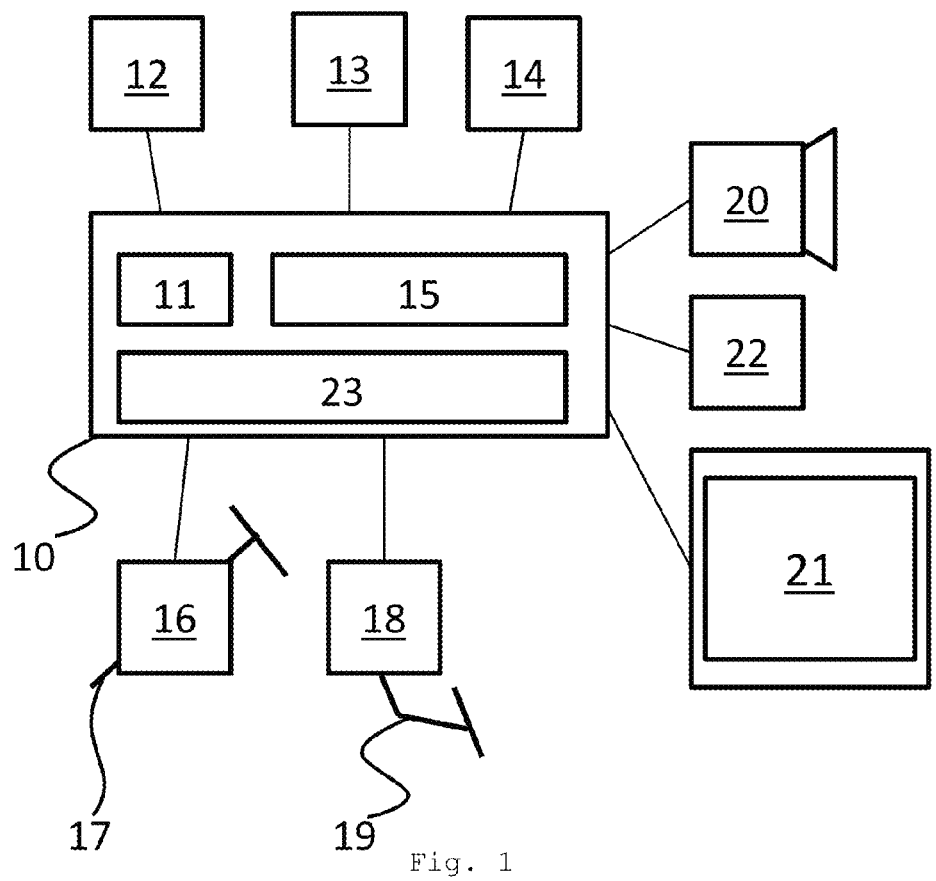

(51) Int. Cl.
*B60W 30/09* (2012.01)
*B60W 30/095* (2012.01)

(56) References Cited

U.S. PATENT DOCUMENTS

| | | |
|---|---|---|
| 7,113,076 B2 | 9/2006 | Yamamura |
| 7,363,135 B2 | 4/2008 | Lin et al. |
| 7,363,155 B2 | 4/2008 | Meister et al. |
| 2011/0155496 A1* | 6/2011 | Baumann ............ B60R 21/0134 180/282 |
| 2013/0124041 A1* | 5/2013 | Belser et al. .................... 701/41 |

FOREIGN PATENT DOCUMENTS

| | | |
|---|---|---|
| DE | 102007060862 A1 | 7/2009 |
| DE | 102009047333 A1 | 6/2011 |
| DE | 102010002105 A1 | 8/2011 |
| WO | WO 2006/045667 A1 | 5/2006 |

* cited by examiner

DRIVER ASSISTANCE SYSTEM

The invention relates to a driver assistance system and a method for vehicles such as cars, motorbikes, ships or aircrafts. The invention also relates to a vehicle employing such a system/method.

Common driver assistant systems (DAS) for vehicles may warn the driver about dangerous situations involving other traffic participants or may trigger actions for avoiding the danger or mitigating the impact of the inevitable consequences.

These systems usually contain an environment perception subsystem, which comprises sensors providing positions and the speed of traffic participants in the environment of the ego vehicle ("ego vehicle" is the vehicle the driver assistance system is deployed in, perceiving action of other participants). "Environment" is the are covered by the input field of the sensor(s) of the DAS. These systems usually contain a subsystem for warning and action generation, including some kind of inference and decision making process.

For example, document U.S. Pat. No. 6,622,076 teaches a device which compares a current trajectory of a vehicle to a desired trajectory of the vehicle. In case of a mismatch between the two trajectories, without turning/moving the steering wheel angle, a haptic communication via the steering wheel is performed. A communication is achieved by a vibration wave on the surface of the steering wheel. Also, the actuation of one of the front brakes can be used for changing the vehicle direction to the desired trajectory.

Some further documents like U.S. Pat. Nos. 7,069,146, 6,934,614, and 7,113,076 propose different means for forcing the driver to the best predicted trajectory, i.e. modulating the steering wheel and accelerator pedal effort.

Document WO 2006/045667 A1 describes a method for driver support in a vehicle, in which a driver assistance system monitors a driving situation of the vehicle. Support takes place after a confirmation or after the absence of an abort instruction, a dialogue about the extent of support the driver wishes being conducted between the driver and the driver assistance system.

Another example is document U.S. Pat. No. 7,363,135. This document describes a driver assistant system that communicates with the driver by vibrating the steering or increasing the steering effort for the driver in case an active control by the vehicle is performing some actions. It informs the driver about the activity of the assistant system, but does not indicate or recommend to the driver what he/she should do in order to motivate the driver to perform a recommended action.

Document U.S. Pat. No. 7,363,155 describes a driver assistant system based on trajectories including the technical means of a short braking impulse for informing the driver about a risk, but without steering and acceleration.

Document U.S. Pat. No. 6,622,076, describes a technique wherein a driver is forced to follow a "desired" path. As long as a mismatch exists between the current trajectory and the desired trajectory, the system communicates to the driver that the driver should change his trajectory. In this the document describes a trajectory supervisory system.

Known systems typically communicate a warning of an upcoming risk to the driver and usually employ some kind of visual, auditory or haptic human machine interaction (HMI) with the driver, e.g. communicating the risk to the driver by vibration, flashing alarm messages, . . . . This means the perceived state of the car or the car environment or an action suggestion is communicated.

This results in the problem that the driver has to cognitively understand and interpret the communicated message, e.g. "there is a risk ahead" and transform it into an appropriate action. This will take an amount of time, which, depending on the driver, will unnecessarily delay execution of the advised action.

Systems that act physically and directly influence the behavior of a vehicle are mostly mitigation systems. They are based on the assumption that a crash with another traffic participant will be inevitable from a physical perspective and that physical actions need to be taken in order to mitigate the consequences of this crash. However, those systems work only for very short time spans before a potential crash. There is no communication between the vehicle and the driver and only drastic preprogrammed maneuvers are fully carried out to prevent or mitigate a crash. The driver has no way of interacting during execution. We consider it to be important to devise a system that acts already a much longer time span before a physically inevitable crash. Our proposal can be combined with such a mitigation system, but it extends the "reaction" time for the driver and delivers support for keeping the vehicle away from risky situations.

The invention now aims at providing a solution to the above outlined problems by providing a method, a system and a vehicle according to the independent claims. Further aspects of the invention are detailed in the independent claims.

In one aspect, the invention provides a driver assistance method, comprising the steps of: sensing a vehicle's state and the environment, on the basis of sensing output signals, determining whether a critical state of the vehicle is to be expected in the if yes, determining a total amount and a time duration of an activation of at least one vehicle actuator required in order to avoid occurrence of the critical state, the activation being of a nature which can be sensed by the driver of the vehicle, and partially performing, by a control module, the activation, i.e. for a portion of the amount and/or a portion of the time duration of the determined total amount and time duration.

The critical state can be determined to be critical based on a prediction and/or evaluation of a plurality of movement change parameters in the sensing output signals, e.g. in association with a sensed feature in the vehicle's state and/or the environment derived from the sensing signals, preferably in association with a type of the sensed feature.

The activation of the at least one vehicle actuator may be performed by actuating the at least one vehicle actuator for a predetermined time according to a movement command executed by the control unit.

The activation can be performed based on a risk and/or utility analysis of the feature's impact on movement of the vehicle.

The movement change command may be executed without or in addition to at least a visual, auditory or haptic communication/feedback/information to the vehicle driver.

The at least one vehicle actuator can perform at least one of a steering, a deceleration and an acceleration action of the vehicle when activated.

The execution of the movement change command may be stopped when a command is received from the vehicle driver, e.g. a steering, breaking and/or acceleration action, especially, when it does not correspond to the action performed by the at least one car actuator.

In another aspect, a driver assistance system is provided, comprising a sensing module sensing a vehicle's state and the environment outputting sensing signals, a interpretation module processing the sensing output signals determining, on the basis of sensing output signals, whether a critical state of the vehicle is to be expected in the future, an evaluation module determining, if a critical sate is expected, a total amount of a time duration of an activation of at least one car actuator required in order to avoid the occurrence of the critical state, the activation being of a nature which can be sensed by the driver of the vehicle, a control module partially performing, by a control unit, the activation, i.e. for a portion of the amount and/or a portion of the determined time duration of the total amount and time duration.

The sensing module can comprise at least one of a camera, a laser scanner, a radar sensor, an acceleration/deceleration sensor, a distance sensor, a speed sensor.

In yet another aspect, the invention provides a vehicle comprising a system as disclosed above adapted to execute a method as disclosed above.

Figure 2:
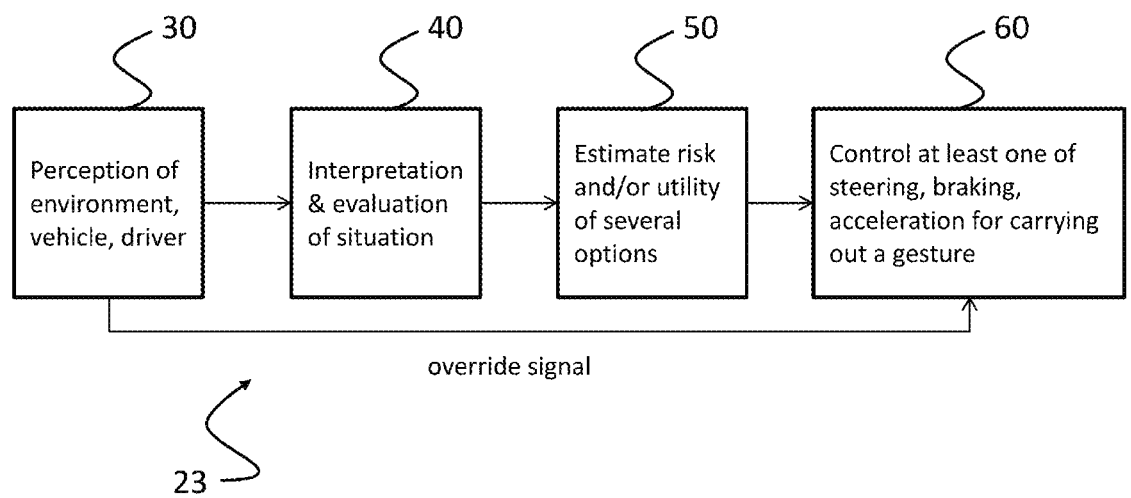

The invention is now explained with reference to the figures. In particular,

FIG. 1 shows exemplarily a driver system for executing the method according to the present invention;

FIG. 2 schematically shows the principal operation steps of the invention; and

Figure 3:
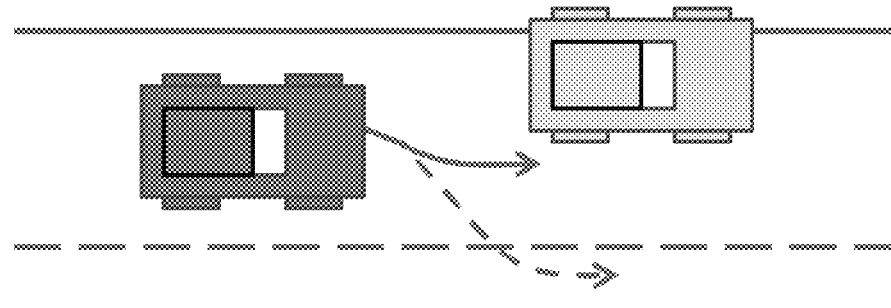

FIG. 3 schematically shows a "CarGesture" (solid arrow) and a possible driver's action (dashed arrow).

Figure 4:
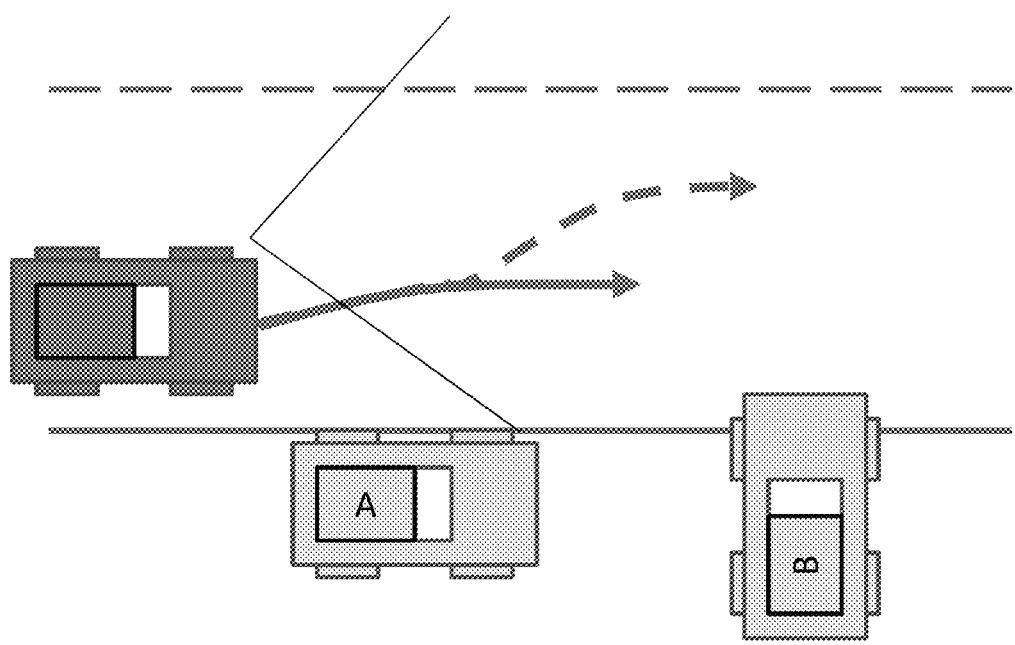

FIG. 4 schematically shows another "CarGesture" (solid arrow) and a possible driver's action (dashed arrow).

The invention targets the mentioned problems by using the actuation of vehicles for more than the pure communication with the driver. All motions of the vehicle have a physical effect but also have an interpretation as a communicative act. The results are communicative physical vehicle movements of actuators of the vehicle, called "CarGestures" in the following, which shall then interpreted by the driver of the vehicle.

While referring to a "car", "CarGestures" can be generally applied to driver driven vehicles, e.g. boats, motorbikes, trucks, construction vehicles, etc.

"CarGestures" are actuations of actuators (e.g. steering wheel, accelerator, brakes, . . . ) of the vehicle that are detectable (visually, acoustically and/or haptically) visible, by other traffic participants and/or the driver of the vehicle and hence convey information from the vehicle being actuated to at least some/one of the other traffic participants. In particular, an actuation in this sense leads to a change in physical movement parameters of the vehicle, e.g. speed, position offset, driving dynamics, acceleration, deceleration, FIG. 1 shows an example for a driver assistance system 10 for executing the method according to the present invention, which is now described also in view of FIG. 2. The driver assistance system 10 uses a processing module 11 employed in an evaluation of a driving situation, e.g. based on output signals provided by a sensing module 30, which sense the vehicle's environment, the vehicle status and/or the behavior of the driver by an evaluation module 50 (shown schematically in FIG. 2). The evaluation module 50 can also be part of or integrate the processing module 11. For this purpose, driver assistance system 10 is connected to various detection means/sensors 12 which detect the driving situation, i.e. the ego vehicle's environment, the vehicle status and driver behavior. These may be external detecting means, e.g. visual sensors such as distance sensors, a camera 14, radar, and/or laser scanners, which detect/precept the exterior/environment of the vehicle. This also may include internal sensors, e.g. a speed sensor 13 which detects the vehicle speed, acceleration and/or deceleration and conveys related information to the driver assistance system 10. Internal sensors may also include internal cameras to observe the driver (not shown).

The data provided by sensors 12, 13, 14 is processed in processing module 11 and analyzed with access to a memory unit 15. Parameters indicative of certain driving situations may be stored in memory unit 15. For example, minimum distances to obstacles in the vehicle's surroundings may be stored required in a parking situation, in particular.

Profiles for the respective drivers may also be provided in memory unit 15. Options on how to address certain driving situations resulting from detected features may also be stored in memory unit 15. In addition, driver assistance system 10 is provided with a powered steering control 16, e.g. an electronic power steering (EPS), via which an appropriate steering angle, predefined or determined by driver assistance system 10, may be set in a powered manner. The driver may correct this steering angle, set with the aid of power, by operating steering wheel 17.

Moreover, driver assistance system 10 is also connected to a brake controller 18. Operation of brake pedal 19 carried out by the driver may be detected, but it is also possible for the vehicle brakes, which are connected to brake controller 18 and are not shown in FIG. 1 for the sake of clarity, to be automatically operated via the driver assistance system and brake controller 18. Of course, the driver assistance system 10 may comprise further controllers, e.g. for actuating the gas pedal, the lights, the horn, etc.

If, after analysis of the data provided by sensors 12, 13, 14, the driver assistance system has determined a driving situation in which an intervention is deemed to be necessary, a "CarGesture" as defined above is executed. Additionally, the driver assistance system 10 can be connected to a speaker 20 and/or a display unit 21, for example, to also convey acoustical and/or visual information to the driver.

An example where human drivers use the control of the vehicle for communicating with the environment is the slow approach of a zebra crossing in order to communicate to a potentially waiting pedestrian that the driver would let the pedestrian cross the street. It also communicates to a following vehicle that a pedestrian might cross and, of course, that the vehicle in front brakes or reduces speed.

The driver assistance system 10 interprets the situation, e.g. a detected feature in the environment potentially having an impact on/influencing the vehicle's movement, a behavior of the driver and/or parameters indicative of vehicle functions and estimates the risk and/or utility by processing the obtained information, especially from the detecting means 12, 13, 14, and by evaluation of these processed information in the evaluation module 40. The driver assistance system 10 then automatically carries out a "CarGesture", i.e. actuates the vehicle or a vehicle actuator 16, 18 in a specific way, in order to communicate with the driver and/or other traffic participants for improving the overall safety and comfort.

The actuation or gesture is hence a communicative act. It indicates to the driver (and/or potential other traffic participants) that a specific action might be beneficial in the current or a future situation. However, only an indication is intended, e.g. the actuating action that would need to be executed to fully address and resolve the situation is only executed partially, without carrying out the respective action calculated to be necessarily executed by the driver assistance system 10 fully by the vehicle. A situation to be addressed by the driver assistance system 10 is when the vehicle is in a critical state or when a critical state occurs in the environment. On the basis of sensing output signals from sensing module 30, it is determined whether a critical state of the vehicle is to be expected in the future. This is facilitated by observing parameters, e.g. movement parameters in the environment or parameters of the vehicle (speed, yaw angle, acceleration, deceleration, temperature, . . . ) or its components (wheels, lights, . . . ). If a critical state is determined, a total amount and a time duration of an activation of at least one vehicle actuator required to avoid occurrence of the critical state is calculated by driver assistance system 10. A critical state typically is a state which influences the vehicle, e.g. its speed, trajectory (i.e. its path of travel), etc.

Based on the indication provided by the actuating action, the driver can decide to accept and to continue with actively performing a intended maneuver indicated by the actuating action or to decline it by simply not following the intended maneuver.

The driver assistance system 10 preferably only once communicates the intended maneuver to the driver by directly actuating the vehicle or a vehicle actuator hereby proposing that the driver should control the vehicle in a specific way. But neither a full action, e.g. an object "avoidance" action, nor a continued supervision of the driver is performed after the actuation action by briefly, i.e. for a predetermined time, actuating or controlling the vehicle as determined advantageous by the driver assistance system 10. In particular, no additional mechanisms like steering wheel vibration or single brake control actuations are required.

The driver assistance system 10 can use a standard Electric Power Steering (EPS) with small angular patterns for the communication with the driver. This means that steering is affected by actuating the steering wheel sideways to a predetermined degree. This results in an interaction pattern, which is designed to feel very natural to the driver, as it indicates a proposed steering direction. Concretely, the invention proposes two concatenated trapeziodal shapes, one positive and the other symmetrically negative. After the gesture the original steering wheel angle is re-assumed. The magnitude of the trapezoids is a few degrees only.

The driver assistance system 10 can be as adapted to work as a virtual driving instructor gently and shortly pulling on the steering wheel, even shortly actuation a gas ore brake pedal.

Haptic information communicated to the driver, e.g. via the steering wheel, such as vibrations, have to be mapped by the brain of the human driver to the intended maneuver. In contrast to using vibrations as a means for communication, the interpretation of which needs to be learned by the driver, being at least in the beginning an additional mental effort, the driver already knows, what should be communicated and achieved by the actuation action. For example, also a direction change of the vehicle without steering movements feels very unnatural to the driver. In relation to the prior art, the described "CarGestures" are very intuitive, since they already indicate in the correct modality what to do without using an additional human-machine interaction (HMI), like interaction by speech or visible messages.

Of course, the feedback or the information conveyed to the driver according to the invention also has a haptic component, as the driver feels, e.g. a turn movement of the steering wheel. However, these haptic impression are known to the driver and do not need further interpretation.

In general, "CarGestures" reduce the amount of information which needs to be processed by the driver and hence the time to process information is reduced. This increases overall safety, not only for the ego vehicle, but also for other traffic participants.

Using only a gesture (i.e. a partially executed movement change command to modify the movement of the vehicle, the command executed in full would address a situation as determined by the driver assistance system 10), leading e.g. to a movement change, rather than an execution of a full maneuver is safer, since the physical impact of a slight movement is very low.

A partially executed movement change command typically is a vehicle actuation or control that only is performed for a short time period, e.g. 0.1 to 3 seconds, for a specific distance covered by the vehicle, e.g. 1 to 20 meters, or a specific offset from a current position, e.g. 5 to 10 cm, e.g. to the left, the front, the back, and/or the right. Yet the driver can still decide to carry out the full maneuver that might add a potential risk. The time, distance, and/or offset might also be set in association with a current speed or a currently executed maneuver or driving action performed by the vehicle. Therefore, for example, these parameters might be different in an area with a low speed limit (e.g. in a range of 5 to 30 km/h) in comparison to driving in a city (e.g. in a range of 30 to 100 km/h), or high-speed driving on the motorway (e.g. with a speed above 100 km/h). Also, an action may be performed differently when the vehicle already performs a turn/acceleration/deceleration action.

In detail, and with further reference to FIG. 2 showing a control unit 23 of the driver assistance system 10, which controls what and how the vehicle and/or vehicle actuators are actuated, a sensing module 30 perceives the world, i.e. the environment of the ego vehicle, the driver and/or the ego vehicle status using the detection means 12, 13, 14.

The situation is interpreted by the following interpretation module 40, which might employ processing 11 followed by an evaluation module 50 evaluating the risk and/or the utility of several movement change commands or driving options and selecting the best one, i.e. a number of possible movement change commands or driving options are first determined depended on a sensed situation by the sensing module 30, from which only one is finally executed.

Driving options in this case are different driving behaviors based on decisions rather than pure trajectory extrapolation. They are dynamically determined by the system based on predictions for the current situation. In the case of several options additional criteria like comfort or understandability by the environment are used for disambiguation.

One option for executing the selection is a ranking of the different determined movement change commands or driving options, which are evaluated to be suitable by the evaluation module 50 to address the situation, e.g. to deal with an occurrence of a feature, which influences motion of a vehicle. E.g. a fitness function may be employed or a scoring function may be implemented assigning a score to suitable options. The option with the most significant score, e.g. lowest or highest, is then chosen as the movement change command to be executed.

A control module 60 finally carries out the corresponding vehicle actuation, i.e. the "CarGesture", indicating to the driver what the best option would be. The actuation is limited in time and degrees of freedom of the action.

In other words, the driver assistance system 10 selects the best option in the situation but only carries out a gesture that indicates this option rather than carrying out the selected option fully. The gesture is always short (i.e. shorter than the time for executing the respective full maneuver, usually less than 2 seconds), self-terminating and carried out in such a way that no additional risk is induced by this gesture. This is ensured by the situation interpretation and evaluation.

They include a prediction of the consequences of the potential actions of the "CarGesture" and the human driver.

During execution, the vehicle actuation can be overridden at any time by the driver by action not being in alignment with the indicated action, e.g. by actuating the steering wheel, the brake or the accelerator pedal. Overriding can mean accepting the proposal of the driver assistance system 10 by carrying out the correct trajectory under the control of the driver. But also, it can mean denying the proposal by following again the original trajectory.

Even if a "CarGesture" is short, human reaction time is normally shorter (about 600 ms) so the human driver is able to override the proposed "CarGesture" even within the time limit. If the driver does nothing, he accepts only the small physical effect/influence on the vehicle resulting from the vehicle actuation (e.g. a 10 cm shift). If the driver accepts, the driver actively continues what was indicated by the actuating action, leading to a bigger physical effect on the vehicle and its environment. In a moving vehicle, the driver is hence quick enough (reacts in about 500-600 ms) to counteract the "CarGesture" if he does not agree with the action proposed. Else, if nothing is done by the driver, the effect the "CarGesture" has on the vehicle is accepted, leading e.g. to a minimal offset from a driving trajectory of the vehicle before the "CarGesture". Else, the driver accepts the "CarGesture" and actively follows the proposed action, e.g. by further turning the steering wheel into the direction proposed and/or indicated by an angular movement of the steering wheel into one direction.

In the following, some examples are provided showing how the driver assistance system works:

EXAMPLE 1

A car is driving in an inner city scenario. The driver assistance system predicts by means of the predicting part of the situation interpretation and evaluation a potentially dangerous situation on the right side of the ego lane. It triggers a steering movement by means of an angular steering pattern that shifts the car 10 cm to the left and does not apply any further control afterwards. The driver feels the steering movement and the lateral acceleration and sees his car is slightly changing the trajectory. The driver might accept this proposal by continuing to steer the vehicle to the left and carry out a full avoidance maneuver including a bigger shift than 10 cm. This might include accepting the risk of moving into the opposing lane by the driver, something the system would have never done. If the driver does not want to follow the maneuver he just continues following the new trajectory with the 10 cm shift or interrupts the gesture by own steering to keep driving on his originally chosen trajectory. The actuation alone will not fully avoid the risk. This exemplarily shown in FIG. 3, where the "CarGesture" is shown as solid arrow, while the operation (potentially) performed by the driver is shown as dashed arrow.

Another example for a "CarGesture" is shown in FIG. 4. Here, car B may start driving into the lane and would represent a risk. Hence the "CarGesture" proposes to keep a little more distance (solid line). This evaluation is based on the orientation of the vehicle and the predicted consequences. Car A does not trigger such kind of a reaction, as it represents no risk.

The thin black lines represent an exemplary field of view of the driver and/or perception means such as sensors (e.g. cameras, laser sensors, etc.) used to sense the environment and to determine potential risks. The predictive steps of the invention are based on the perceived environment. They indicate how likely an object affects the vehicle, based on parameters such as object movement, trajectory, and/or acceleration. They also might indicate a degree of predicted influence the object has on the vehicle and based on this indication a "CarGesture" may be performed.

A "CarGesture" is a specific action for a specific situation which has a specific time duration. As long as the situation does not change, the decision of the driver is memorized and preferably no new "CarGesture" is triggered. That means that especially the (expected) time duration for executing the full movement change needs to be calculated by the driver assistance system 10 but also the decision of the driver is preferably memorized.

More generally, the "CarGestures" typically lead to small shifts of the vehicle (e.g. an offset of about 10 cm from a current position), and have the following properties: They are noticeable to the driver, but the induced risk to the environment is small. Such small shifts are also almost unnoticeable to other traffic participants, i.e. such kind of a gesture is inward oriented. This kind of "CarGesture" does not irritate other traffic participants the carrying out frightening movements like moving in the opposite lane. Other gestures like slight steering to the right, braking or acceleration and/or a combination thereof are also possible candidates for vehicle actuations.

EXAMPLE 2

Another Example is the predictive stopping in front of the zebra crossing. The system decelerates slightly in front of the zebra crossing in order to indicate to the driver that stopping would be a good option. In this case the communication is in the direction of the driver and the pedestrian waiting at the zebra crossing. Here an overriding action by the driver, with which the driver can supersede an action by the driver assistance system at any time, should have a higher threshold since the pedestrian may understand that the car is about to stop as indicate by the "CarGesture". This should only be overridden in very severe cases.

The driver assistance system 10 can hence store in memory 15 specific situations together with threshold values for these situations. Using the sensing output signals of the sensing module, the interpretation module 40 can then identify the situation and derive the corresponding threshold value. The interpretation module 40 can match the sensing output or perceived parameters to a stored situation. For example, in the above outlined scenario, the threshold associated with the matching situation will be high and so it will be harder to override the proposed movement command. However, the threshold can also be calculated dynamically out of parameters derived from the sensing output.

In this regard, a decision requires measure and a threshold is one kind of evaluating a measure. The threshold might depend on a detected driving character and a detected mood of the driver and on the evaluation of the overall situation including the vehicle status and other movement parameters.

EXAMPLE 3

Another Example is the predictive slowing down in order to let another car join our current lane in order to resolve a congestion created by this other car.

EXAMPLE 4

Another Example is the slowing down in order to let another car clear a crossing in order to resolve a congestion created by this other car. It should be understood that the assistance system determining and performing the "CarGestures" can be coupled to other assistance systems, e.g. a collision avoidance system.

The "CarGestures" work on a preventive and communicative time scale, while a physical collision avoidance system would span a "safety net" underneath. E.g. while the "CarGesture" suggest a driving action to the driver, other assistance systems may be employed to finally prevent accidents.

Those car gestures are oriented towards driver and the environment.

Further, the invention can also be applied in various other domains, one of them being robotics but as well applied in systems for ground, water and/or air bound vehicles, generally including systems designed to assist a human operator. The method and system disclosed herein in general may be used whenever a technical (e.g., an electronic) system is required to autonomously deal with features occurring in a movement path observed and/or properties of objects (e.g., size, distance, relative/absolute position also to other objects, spatial alignment, relative movement, speed and/or direction and other related object features or feature patterns) which are presented to the system.

In order to process the obtained information (observations), the invention may use and include analysis means employing the processing module 11, 40 and/or apply neural networks, which can generally be used to infer functions from observations. Neural networks allow working with none or only little a priori knowledge on a problem to be solved and also show a failure tolerant behavior. Problems that may be addressed relate, e.g., to feature identification, control (vehicle control, process control), decision making, machine vision and/or pattern recognition (facial recognition, object recognition, gesture recognition, speech recognition, character and text recognition), etc. A neural network thereby consists of a set of neurons and a set of synapses. The synapses connect neurons and store information in parameters called weights, which are used in transformations performed by the neural network and learning processes.

Typically, to make an observation, an input signal or input pattern is accepted from the detection means 12, 13, 14, which is processed using a neural networks implemented and/or hardware units and software components. An output signal or output pattern is obtained, which may serve as input to other systems for further processing, e.g. for visualization purposes.

The input signal, which may also include information on detected features influencing movement, may be supplied by one or more sensors, e.g. the mentioned visual or acoustic detecting means 12, 13, 14, but also by a software or hardware interface. The output pattern may as well be output through a software and/or hardware interface or may be transferred to another processing module 11 or actor, e.g. the powered steering control 16 or the brake controller 18, which may be used to influence the actions or behavior of the vehicle.

Computations and transformations required by the invention necessary for evaluation, processing, maintenance, adjustment, and also execution (e.g. of movement change commands or actuation commands) may be performed by a processing module 11 such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

Also data memory is usually provided. The data memory is used for storing information and/or data obtained, needed for processing, determination and results. The stored information may be used by other processing means, units or modules required by the invention. The memory also allows storing or memorizing observations related to events and knowledge deducted therefrom to influence actions and reactions for future events.

The memory may be provided by devices such as a hard disk (SSD, HDD), RAM and/or ROM, which may be supplemented by other (portable) memory media such as floppy disks, CD-ROMs, Tapes, USB drives, Smartcards, Pendrives etc. Hence, a program encoding a method according to the invention as well as data acquired, processed, learned or needed in/for the application of the inventive system and/or method may be stored in a respective memory medium.

In particular, the method described by the invention may be provided as a software program product on a (e.g., portable) physical memory medium which may be used to transfer the program product to a processing system or a computing device in order to instruct the system or device to perform a method according to this invention. Furthermore, the method may be directly implemented on a computing device or may be provided in combination with the computing device.

It should be understood that the foregoing relates not only to embodiments of the invention and that numerous changes and modifications made therein may be made without departing from the scope of the invention as set forth in the following claims.

The invention claimed is:

1. Automated driver assistance method, the method using an artificial computing unit and one or more sensors, the method comprising the steps of:
   sensing a vehicle's state and the environment,
   on the basis of sensing output signals, determining whether or not a critical state of the vehicle is to be expected in the future,
   if yes, determining a total amount and a time duration of an activation of at least one vehicle actuator that leads to a change in physical movement parameters of the vehicle required in order to avoid occurrence of the critical state, and
   modifying the movement of the vehicle by performing a part of the activation by actuating the at least one vehicle actuator for a portion of the determined total amount and/or a portion of the determined time duration, wherein the part of the activation is a vehicle actuation or control that only is performed for a short time period, for a specific distance covered by the vehicle, or a specific offset from a current position and is set in association with a current speed or a currently executed maneuver or driving action performed by the vehicle and is of a nature which can be sensed by the driver of the vehicle, wherein, after the part of the activation is performed, no other part of said activation required in order to avoid occurrence of the critical state is performed.

2. The method of claim 1, wherein
the critical state is determined to be critical based on a prediction and/or evaluation of a plurality of movement change parameters in the sensing output signals, in association with a sensed feature in the vehicle's state and/or the environment derived from the sensing signals, preferably in association with a type of the sensed feature.

3. The method according to claim 1, wherein
the activation of the at least one vehicle actuator is performed by actuating the at least one vehicle actuator for a predetermined time according to a movement change command executed by the control unit.

4. The method according to claim 1, wherein
the activation is performed based on a risk and/or utility analysis of the feature's impact on movement of the vehicle.

5. The method according to claim 3, wherein
the movement change command is executed without or in addition to at least a visual, auditory or haptic communication/feedback/information to the vehicle driver.

6. The method according to claim 1, wherein
the at least one vehicle actuator performs at least one of a steering, a deceleration and an acceleration action of the vehicle when activated.

7. The method according to claim 3, wherein
the execution of the movement change command is stopped when a command is received from the vehicle driver, with respect to a steering, breaking and/or acceleration action, and the command does not correspond to the action performed by the at least one vehicle actuator.

8. Driver assistance system, comprising
a sensing means for sensing a vehicle's state and the environment and outputting sensing signals,
a means for processing the sensing output signals and determining, on the basis of sensing output signals, whether or not a critical state of the vehicle is to be expected in the future,
a determining means for determining, if a critical sate is determined, a total amount of a time duration of an activation of at least one vehicle actuator that leads to a change in physical movement parameters of the vehicle required in order to avoid the occurrence of the critical state,
a control means for outputting a control signal in order to modify the movement of the vehicle by performing a part of the activation by actuating the at least one vehicle actuator for a portion of the determined total amount and/or a portion of the determined time duration, wherein the part of the activation is a vehicle actuation or control that only is performed for a short time period, for a specific distance covered by the vehicle, or a specific offset from a current position and is set in association with a current speed or a currently executed maneuver or driving action performed by the vehicle and is of a nature which can be sensed by the driver of the vehicle, wherein, after the part of the activation is performed, no other part of said activation required in order to avoid occurrence of the critical state is performed.

9. The system of claim 8, wherein
the sensing means comprises at least one of a camera, a laser scanner, a radar sensor, an acceleration/deceleration sensor, a distance sensor, a speed sensor.

10. A driver assistance system being programmed to perform a method, comprising:
sensing a vehicle's state and the environment,
on the basis of sensing output signals, determining whether or not a critical state of the vehicle is to be expected in the future,
if yes, determining a total amount and a time duration of an activation of at least one vehicle actuator that leads to a change in physical movement parameters of the vehicle required in order to avoid occurrence of the critical state, and
modifying the movement of the vehicle by performing a part of the activation by actuating the at least one vehicle actuator for a portion of the determined total amount and/or a portion of the determined time duration, wherein the part of the activation is a vehicle actuation or control that only is performed for a short time period, for a specific distance covered by the vehicle, or a specific offset from a current position and is set in association with a current speed or a currently executed maneuver or driving action performed by the vehicle and is of a nature which can be sensed by the driver of the vehicle, wherein, after the part of the activation is performed, no other part of said activation required in order to avoid occurrence of the critical state is performed.

11. A vehicle comprising:
a driver assistance system comprising
a sensing means for sensing a vehicle's state and the environment and outputting sensing signals,
a means for processing the sensing output signals and determining, on the basis of sensing output signals, whether or not a critical state of the vehicle is to be expected in the future,
a determining means for determining, if a critical sate is determined, a total amount of a time duration of an activation of at least one vehicle actuator that leads to a change in physical movement parameters of the vehicle required in order to avoid the occurrence of the critical state,
a control means for outputting a control signal in order to modify the movement of the vehicle by performing a part of the activation by actuating the at least one vehicle actuator for a portion of the determined total amount and/or a portion of the determined time duration, wherein the part of the activation is a vehicle actuation or control that only is performed for a short time period, for a specific distance covered by the vehicle, or a specific offset from a current position and is set in association with a current speed or a currently executed maneuver or driving action performed by the vehicle and is of a nature which can be sensed by the driver of the vehicle, wherein, after the part of the activation is performed, no other part of said activation required in order to avoid occurrence of the critical state is performed.

* * * * *